Nov. 27, 1934.　　J. E. GOLOB　　1,982,051

MOTORSTAT

Filed Oct. 17, 1932

INVENTOR.
John E. Golob.
BY Slough and Canfield
His ATTORNEYS

Patented Nov. 27, 1934

1,982,051

UNITED STATES PATENT OFFICE 1,982,051

MOTORSTAT

John E. Golob, Cleveland, Ohio, assignor to The Bishop & Babcock Mfg. Company, Cleveland, Ohio, a corporation of Ohio Application October 17, 1932, Serial No. 638,112

6 Claims. (Cl. 236—34)

This invention relates to thermostatically operated devices for controlling the flow of fluid and more particularly relates to thermo-responsive valve devices for opening and closing fluid passages to regulate the flow of fluid therethrough.

Generally similar type thermostatic valve devices adapted to be installed in a water cooling system of an automotive engine have been heretofore used such as that patented by E. J. Levy, Patent No. 1,822,863, issued September 8, 1931. These thermostatic valves were primarily adapted to be placed within the water jacket itself as original equipment on automotive vehicles or to be later installed, in which case they were disposed in a suitable housing and placed intermediate the water jacket and the cooling radiator.

However, it was found that it was relatively expensive to enclose the valve device in a housing adapted to connect in fluid-tight relation at each end with the hose or the like leading from the water jacket to the cooling radiator. Further, it was found that it was impractical to install a valve device encased in a housing to various makes of cars due to the limited space intermediate the water jacket and the radiator, no thought having been given to the installation of a thermostatic valve controlling the fluid of the water-cooling system when the vehicle was designed.

Despite reductions in the size of the valve units themselves consistent with the relatively high fluid pressures demanded to be controlled thereby, the overall length of the enclosing housing was too great to permit of their use on the aforementioned cars, thus precluding these cars from the advantages of a thermostatically controlled water-cooling system.

I have effected a thermostatic valve device of the type described in the aforementioned patent, which for the same capacity is relatively easier and more economical to manufacture.

It is an object of my invention, therefore, to provide an improved thermostatically controlled valve mechanism adapted to be operated in a fluid circulatory system, which is relatively compact.

Another object of my invention is to provide a mechanism of the above type adapted to be installed in a water-cooling system of an automotive engine which requires a minimum of space for installation.

Another object of my invention is to provide a mechanism of the above type adapted to be installed in a water-cooling system of an automotive engine which is relatively inexpensive to manufacture and assemble.

Another object of my invention is to provide an improved unitary thermostatically operable valve mechanism for automotive engine circulatory cooling systems adapted to be interchangeably and easily installed intermediate a water jacket and a cooling radiator.

Other objects of my invention will be apparent to those skilled in this art.

My invention is fully disclosed in the following description taken in connection with the accompanying drawing, in which.

Figure 1:
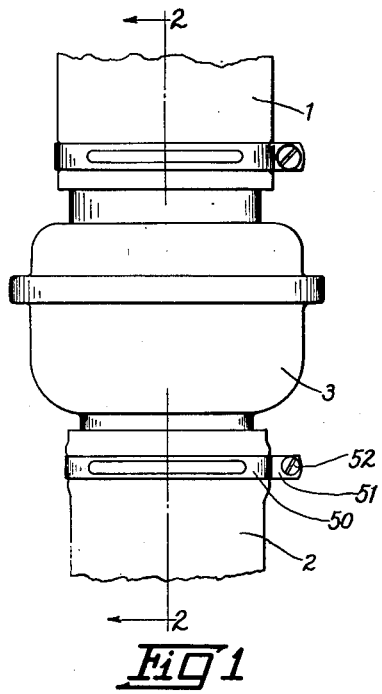
Fig. 1 is a fragmentary elevational view of a preferred embodiment of my invention as it appears in a cooling system line of flow.

Referring to the drawing, I have indicated at 1 a fluid conduit and at 2 a continuation thereof, a valve device generally indicated at 3 being sealedly connected to the conduits 1 and 2 whereby the flow of fluid therethrough may be controlled by thermally operable means.

The conduits 1 and 2 may represent the preferably flexible connection from the water jacket of an automotive engine to the radiator and the thermostatic valve device 3 is installed by cutting away an intermediate portion of the conduit and sealedly engaging the end portions of the conduits 1 and 2 therewith in any suitable manner such as clampings.

The working parts of the valve device 3 are enclosed in a housing comprising a vertical cylindrical tubular valve seat portion 5 having integral therewith an enlarged tubular portion 6 terminating in an outwardly extending radial flange 7 and a mating tubular element 8 having an outwardly extending radial flange which is preferably spun to form a generally U-shaped interlocking portion as indicated at 9 whereby the two housing portions are secured together.

A sealing washer 10 composed of any suitable material is preferably placed intermediate the flanges of the housing members prior to spinning to insure a fluid-tight relation therebetween. The housing portion 8 is provided with an integral reduced coaxial tubular portion 11 adapted to engage the conduit 2 and is preferably provided with transverse ridges as indicated at 60 to restrain axial movement of the conduit relative to the housing.

Suspended from the tubular portion 6 is a generally U-shaped frame 12 comprising vertical hangers 13—13 adapted at their upper terminations to be projected through apertures provided therefor in the portion 6 and integrally secured therewith by flanging over as indicated at 14. The lower ends of the hangers 13 are joined by an integrally formed generally circular horizontally disposed pan 15.

The pan is formed to have an annular recess, concave upwardly as at 16, and the recess forms the seat for a thermostatic element shown generally at 20, the thermostatic element comprising a bellows 17, preferably of metal, and of known or suitable form. The lower end of the bellows may be sealed in the recess by an annular filler of solder or the like 18 joining the bellows 17 and the pan 15. The upper end of the bellows is joined by a similar filler of solder 19 to a bellows head 21, preferably formed from sheet metal and provided with an annular downwardly convex bead 22 to contribute strength and stiffness thereto and to provide a recess for solder for a purpose to be described.

The head 21 has a central perforation 23, in which a lower valve stem 24 is secured and sealed in the following manner. The lower stem 24 is preferably turned down from a cylindrical bar leaving a collar 25 providing a reduced neck 26 which is inserted in the aperture 20 and then riveted or spun over to grip the edge of the aperture 23 between the collar and the riveted portion.

To seal the joint thus made, solder as at 27 may be applied in the annular recess between the bead 22 and the riveted portion 26.

The stem 23 is also turned down above the collar 25 and threaded as at 28 to receive a turnbuckle 29. The axis of the stem 23 is bored out as at 30 to provide a passageway by which the interior of the bellows may be exhausted to produce a vacuum therein and by which a heat expansible gas or fluid may be admitted to the bellows for a well known purpose; and the passageway may be sealed by a plug 31 and solder 32.

It will be understood that by this construction, the space enclosed by the bellows 17, pan 15, head 21 and lower stem 23 is hermetically sealed.

The turnbuckle referred to is preferably of hexagon form (not shown) to receive a wrench for a purpose to be described and is internally bored and threaded to mate with the thread 28 at its lower end and at its upper end is internally bored and threaded as at 33 to receive an upper valve stem 34. The threads 33 are left-hand with respect to the thread 28; thus when the turnbuckle turns about its axis, it will adjustably draw the valve stem 34 downwardly or propel it upwardly, as will be understood and for a purpose to be described.

When this adjustment has been properly determined in the assembly of the device, it may be made permanent in any suitable manner as for example by spotting with solder as at 35.

Figure 4:
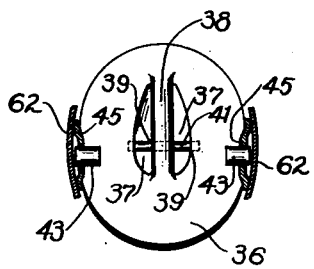
Fig. 4 is a plan view of a valve element which I may employ.

The valve proper 36 consists of an elliptical disc shown separately in Fig. 4. The under side of the disc is provided with spaced downwardly extending projections 37—37 leaving therebetween a central rib 38.

The projections 37 are provided with aligned transverse perforations as indicated at 39 and the disc is pivotally connected to a perforated head 40 of the upper valve stem 34 by means of a pin 41 which is inserted in the aligned perforations 39 provided in the disc and the perforation in the valve stem head 40, the pin 41 being restrained in axial movement relative to the disc in any suitable manner such as by flanging over the pin ends.

The disc is provided with trunnions 43—43 preferably formed of a cylindrical pin slotted as indicated at 44 whereby the trunnions may embrace the disc and be affixed thereto by any suitable means such as soldering.

The upper tubular housing portion 5 is pressed inwardly as indicated at 45—45, the depressions being centrally perforated to provide aligned bearings for the trunnions 43, the trunnion ends terminating inwardly of the external surface of tubular portion 5. The disc is flared inwardly at the trunnion as indicated at 46 to conform substantially to the inner contour of the depression 45 in the tubular portion 5 to permit free movement of the disc relative to the portion 5.

By referring to Fig. 4, it will be noted that the pin 41 and the trunnions 43 have spaced substantially parallel axes, the axes being spaced along the longitudinal or major axis of the elliptical-shaped disc. The valve 36 and its associated parts above described are so constructed that the axis of the pin 41 lies to one side of the minor axis of the elliptical-shaped disc and the axis of the trunnion 43 lies at an opposite side in the preferred construction, although it is understood that the relative positioning of the axes may be altered as desired.

Figure 2:
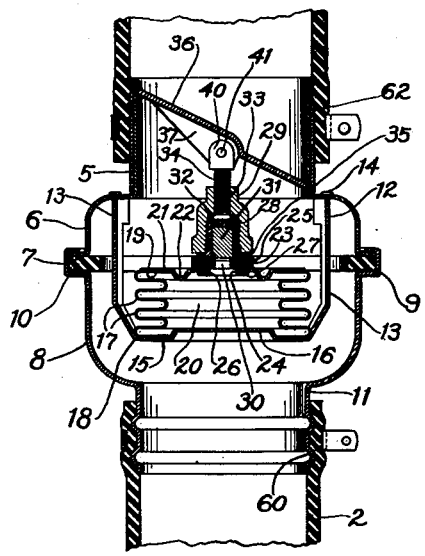
Fig. 2 is a vertical medial sectional view taken along the lines 2—2 of Fig. 1.

The elliptical periphery of the valve 36 when in the closed position as illustrated in Fig. 2, comes into valve-closing contact with the inner wall of the tubular valve seat 5. By means of its tubular form, the valve seat element 5 may also function as a passageway through which fluid to be controlled may flow. In a manner to be referred to later, the thermostatic element 20, at relatively low temperature, may be caused to pull downwardly on the valve stem 34 and oscillate the valve 36 into pressure contact with the valve seat 5. The pressure thereof may be adjusted as desired by turning the turnbuckle 28 to draw downwardly or propel upwardly the valve stem 34.

The thermostatic element 20 is shown in Fig. 2 with its parts in position which they assume at relatively low temperatures. Thermostatic element 20 has the well known characteristic of bellows thermostat contracting along its central axis on a reduction of temperature, and expanding along the axis on a rise of temperature. With this purpose, the bellows may be assembled with any suitable degree of vacuum therein and containing any suitable heat expansible material such as liquid or gas.

Under the conditions described for its connection with Fig. 2, the vacuum therein exerts a downward pull upon the head 21 and hence on the stem 34. Upon a rise of temperature, the vacuum decreases and the downward pull decreases correspondingly.

One of the preferred applications of my invention is in the control of the water circulating system of an internal combustion engine. When applied to this use, the water is circulated under pressure by means of the usual pump, not shown, disposed through the valve device when the valve is in the open position and thence to the automobile radiator and is cooled therein; and when the valve closes the flow through the radiator is discontinued.

The conduit 2 leading from the water jacket to the valve device is usually composed of flexible tubing such as rubber and is preferably secured to the valve device by means of a strap 50 having spaced substantially parallel outwardly extending ends 51, which are perforated to receive a screw 52 which threadedly engages a bolt (not shown) at its end whereby the tension exerted by the strap 50 may be controlled in a well known manner. The conduit 1 which leads from the valve device to the radiator is affixed to the valve seat portion 5 in a similar manner.

As previously stated, my improved valve device 10 is peculiarly adapted to installation in the conduit connecting the water jacket with the radiator of an automotive engine, since it is relatively compact and the overall length is reduced to a minimum enabling it to be installed in engines not adapted to prior devices due to the overall length required.

By positioning the axis of the trunnion 43 at one side of the axis of the tubular valve seat 5 as previously described, the area of the valve at the left of the valve axis (as viewed in Fig. 2) and therefore exposed to the water pressure set up by the pump is greater than the area at the right of the valve axis, so that the water pressure tends to move the valve to open it or if opened to open it farther, and this opening pressure is opposed by the downward force of the thermostatic element which tends to hold the valve closed or to close it.

In the operation of my valve device, it will now be apparent that when the temperature of the fluid, for example the cooling water in an internal combustion engine, is below its predetermined value, the thermostatic element 20 will hold the valve 36 closed. The forces acting on the valve will be the water pressure tending to open it and the opposing force of the thermostatic element tending to close it, the latter force being adjustable by the turnbuckle 28.

At any adjustment of the turnbuckle 28, the downward pull of the thermostatic element 20 is, as will be understood, due to the degree of vacuum inside the bellows 17. Stated otherwise, the pressure of the water on the head 21 of the thermostatic device tends to collapse the bellows 17, and the pressure of the vapor or gas contents of the bellows opposes the said water pressure; the internal pressure may be reduced to a suitable amount so that at relatively low temperatures and at higher temperatures up to a predetermined valve regulating temperature, said water pressure outside the bellows 17 will be greater than the internal pressure and give a resultant downward pull on the valve stem 34. It is understood, of course, that upon a rise of temperature, the contents of the bellows 17 will expand to increase the internal pressure.

The temperature of the water being at a relatively low value, upon operating the engine, the temperature of the water will rise and will reach a value at which the downward pull of the thermostatic element will have diminished to such a point that the resultant pressure of the water on the valve tending to open it will equal and counter-balance said pull. This is the predetermined temperature at which the valve will be actuated. Upon further rise of temperature, the downward pull of the thermostatic device will continue to decrease and the water pressure directly on the valve will open it and the downward pull of the thermostatic element decreases more and more upon further rise of temperature and the water pressure will open the valve more and more.

The expansion of the fluid content of the bellows expands the bellows to assist the water pressure on the valve opening movement. The farther the valve opens, the less will be the opening force thereon due to the water pressure because the valve takes up a position increasingly in the direction of flow and, due to the open valve, the pressure in the system diminishes. Concurrently, the downward force exerted by the thermostatic element diminishes, is discontinued, and is subsequently reversed upon increased temperatures to supplement the water pressure tending to open the valve. Thus, the valve opening force of the water pressure and the valve closing force of the thermostatic element tends at all positions to be balanced.

The valve opened as described, permits the water to flow to the radiator to be cooled, thus stopping a rise of temperature. As the radiator lowers the water temperature, the force of the thermostatic element will increase and the valve will partially close, thus reducing the rate of flow of water through the radiator, and reducing the cooling effect thereby.

Thus, the position of the valve 34 is regulated and the flow of water through the radiator is controlled thereby in response to both the temperature and pressure of the water to maintain substantially constant water temperature at a predetermined high temperature value. This value may be chosen as the efficient operating temperature of the engine.

Also, when the engine is cold, the valve will remain closed, permitting the engine to heat up quickly to an efficient operating temperature. After operating, the engine is stopped, thus stopping the pressure in the water system, and the valve will be under the control only of the thermostatic element and therefore will close while the temperature is still high, shutting off the thermal circuit of the water, thus retaining heat to keep the engine warm.

If at any time and due to any cause, the bellows of the thermostatic device becomes punctured or broken so that the vacuum therein is destroyed, the water pressure will be sufficient at once to open the valve; and thus the failure of the device as a regulating device will not prevent the circulating system from functioning in the usual or regular manner.

Figure 3:
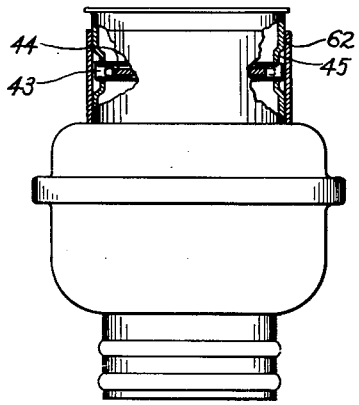
Fig. 3 is an elevational view, partly broken away, of the valve device of Figs. 1 and 2 for installation in the cooling system.

I preferably employ a sleeve 62 of relatively thin material and split so that it may be disposed over the end of the tubular valve seat 5 and thereby encircle the outer surface of the valve seat. As is most clearly illustrated in Fig. 3, this prevents any tendency of the flexible conduit material from being forced into contact with the trunnions 43 and thereby interfere with the free operation of the valve disc. The sleeve 60 also provides a means of adapting the same size valve device to varying sized conduits.

One of the advantages of my improved valve device relative to prior similar devices is that it is inexpensive to manufacture in that the tubular valve seat is utilized as a portion of the housing enclosing the valve device. This eliminates the necessity of a separate upper housing portion as employed in prior similar devices and permits of a considerable shortening of the overall length of the valve device which results in a considerable advantage as previously pointed out.

Thus, a cheap bellows type thermo-responsive valve adapted to be quickly and easily inserted in the conduit connecting the water jacket and the radiator of an engine is provided which requires a minimum of length for a maximum of control.

Many and extensive changes and variations may be made in my invention without departing

I claim:

1. A unitary thermostatic valve construction comprising a casing having a tubular end portion for insertion into a hose line, a valve element pivotally supported in the tubular end portion for controlling flow therethrough, a thermostatic device for moving the valve element responsive to temperature changes of fluid flowing through the tubular end portion, bearings for the valve element comprising inwardly depressed opposite wall portions of the tubular end portion, the depressed wall portions being perforated, and valve element trunnions in the perforations, and a sleeve telescoped over the tubular end portion clearing the outer axial ends of the trunnions.

2. A unitary thermostatic valve construction comprising a casing having a tubular end portion for insertion into a hose line, a valve element pivotally supported in the tubular end portion for controlling flow therethrough, a thermostatic device for moving the valve element responsive to temperature changes of fluid flowing through the tubular end portion, bearings for the valve element comprising inwardly depressed opposite wall portions of the tubular end portion, the depressed wall portions being perforated, and valve bearing elements pivotally oscillatable in the perforations and a shield on the outer wall of the tubular end portion covering the outer ends of the bearing elements projecting through the perforations.

3. A thermostatic valve mechanism, adapted to be interposed in a hose line and to form a length of conduit therefor comprising a two-piece casing consisting of two casing parts, each having a reduced tubular end extending oppositely to the similar end of the other part, the parts being sealedly joined together at relatively enlarged adjacent ends, one of said parts forming the sole support for a thermostatic valve device, said device comprising a bellows thermostat, a butterfly valve means, a motion communicating link means between said valve means and thermostat and a supporting strap for carrying the thermostat on said part, said thermostat and strap being projected into an enlarged intermediate portion of said casing, said valve means being pivoted transversely within the reduced tubular end of said part, said valve means comprising vane means adapted to extend in opposite directions from a transversely medial portion of the tubular end of said part substantially to the lateral walls thereof, to close the passage through the casing when the fluid therein surrounding the thermostat is at a predetermined low temperature, said thermostat operable to communicate motion through said link means to said vane means to variably open the passage upon increases of temperature of said fluid, the reduced tubular end of said device supporting part adapted to be telescoped within a hose line end constrictingly engaging it and guarding means maintaining said valve and pivot therefor free of contact from said hose line end and sealing said casing at said pivots.

4. A thermostatic valve mechanism adapted for interpositioning in a hose line as a unitary mechanism, comprising a pair of oppositely extending tubular casing elements sealedly joined together at interfitting adjacent enlarged ends, one of said elements telescopable by its other reduced end within the end of a hose line adapted to be clamped thereon, an oscillatable valve transversely pivotally supported on the side walls of said reduced element end and means carried by said reduced end guarding adjacent portions of said pivoted valve means from contact with said clamped on hose line end, said guarding means forming a seal for said side walls against the leakage of fluid from said casing.

5. A unitary thermostatic valve mechanism adapted for interpositioning in a hose line comprising a pair of tubular casing elements, each telescopable by an end within a hose line end adapted to be clamped thereon, one terminating at its other end in an enlarged annular portion, the other in an annular portion adapted for sealed connection with the enlarged portion of the other element, oscillatable valve means transversely pivotally supported on the side walls of and positioned within a relatively reduced tubular portion of a first casing portion, a thermostat supported on said first casing portion, motion transmitting means between said thermostat and said valve whereby said valve is oscillated to variably regulate the flow through said casing portion upon changes of temperature imposed upon said thermostat, and means guarding adjacent portions of said pivoted valve means from contacting said hose line end, said guarding means sealing said side walls against leakage of fluid in the casing.

6. A thermostatic valve mechanism adapted for interpositioning in a hose line as a unitary mechanism, comprising a pair of oppositely extending tubular casing elements sealedly joined together at interfitting adjacent enlarged ends, one of said elements telescopable by its other reduced end within the end of a hose line adapted to be clamped thereon, an oscillatable valve transversely pivotally supported on the side walls of said reduced element end and means carried by said reduced end, said reduced end and said pivoted valve means being relatively so disposed and formed that said valve means and all associated parts movable therewith when said valve means are operated are guarded from contact with said clamped on hose line end, said reduced end being so formed as to provide a seal against the leakage of fluid from said casing through said side walls adjacent the junction therewith of said valve means and associated movable parts.

JOHN E. GOLOB.